(12) United States Patent
Loprieno et al.

(10) Patent No.: US 10,986,426 B1
(45) Date of Patent: Apr. 20, 2021

(54) MEASURING FIBER ASYMMETRY

(71) Applicant: Cisco Technology, Inc., San Jose, CA (US)

(72) Inventors: Gilberto Loprieno, Milan (IT); Luca Della Chiesa, Concorezzo (IT); Stefano Binetti, Monza (IT); Stefano Piciaccia, Milan (IT); Giovanni Osnago, Lecco (IT)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/732,836

(22) Filed: Jan. 2, 2020

(51) Int. Cl.
| | | |
|---|---|---|
| *H04Q 11/00* | (2006.01) | |
| *H04B 10/079* | (2013.01) | |
| *H04B 10/071* | (2013.01) | |
| *H04L 7/00* | (2006.01) | |

(52) U.S. Cl.
CPC ....... *H04Q 11/0066* (2013.01); *H04B 10/071* (2013.01); *H04B 10/079* (2013.01); *H04L 7/00* (2013.01); *H04Q 2011/0079* (2013.01)

(58) Field of Classification Search
CPC ........ H04Q 11/0066; H04Q 2011/0079; H04B 10/071; H04B 10/079; H04L 7/00
USPC .......................................................... 398/48
See application file for complete search history.

(56) References Cited

U.S. PATENT DOCUMENTS

| | | | | |
|---|---|---|---|---|
| 9,762,318 B2 * | 9/2017 | Xu | ........................ | H04B 10/25 |
| 10,523,317 B2 * | 12/2019 | Masuda | ............... | G02B 6/4467 |
| 2002/0012137 A1 * | 1/2002 | Jager | .................. | H04B 10/0771 398/31 |
| 2005/0285058 A1 * | 12/2005 | Beller | .................... | H04B 10/07 250/559.38 |
| 2009/0097014 A1 * | 4/2009 | Piciaccia | .............. | G01M 11/338 356/73.1 |
| 2009/0196615 A1 * | 8/2009 | Kauffman | ........ | H04B 10/07951 398/79 |
| 2013/0195443 A1 * | 8/2013 | Yin | ....................... | H04J 3/0638 398/25 |

(Continued)

OTHER PUBLICATIONS

Cisco, "Optical Service Channel Cards", Cisco ONS 15454 DWDM Reference Manual, R8.5, Chapter 3, 14 pages, retrieved from Internet Oct. 17, 2019.

(Continued)

*Primary Examiner* — Abbas H Alagheband
(74) *Attorney, Agent, or Firm* — Edell, Shapiro & Finnan, LLC (57) ABSTRACT

A method of obtaining a measure of asymmetry between optical fibers of a forward and reverse paths is provided in order to synchronize clocks of optical nodes connected by asymmetrical optical fiber paths. The method includes receiving, at first and second arrival times, from a first optical network device, a first optical signal transmitted on a first optical fiber and a second optical signal transmitted on a second optical fiber, calculating a first time difference between the second arrival time and the first arrival time. The method includes determining a measure of asymmetry between the first optical fiber and the second optical fiber based on the first time difference and a second time difference between a first time of transmission by the first optical network device of the first optical signal and a second time of transmission by the first optical network device of the second optical signal.

20 Claims, 5 Drawing Sheets

(56) References Cited

U.S. PATENT DOCUMENTS

| | | | |
|---|---|---|---|
| 2013/0209096 A1* | 8/2013 | Le Pallec | H04J 3/0635 |
| | | | 398/35 |
| 2014/0269672 A1* | 9/2014 | Zampetti | H04W 56/0015 |
| | | | 370/350 |
| 2015/0104167 A1* | 4/2015 | Bottari | H04B 10/2513 |
| | | | 398/16 |
| 2015/0229388 A1* | 8/2015 | Xu | H04B 10/25 |
| | | | 398/29 |
| 2016/0105341 A1* | 4/2016 | Cavaliere | H04J 14/0267 |
| | | | 398/33 |
| 2017/0195110 A1* | 7/2017 | Ruffini | H04W 56/0015 |
| 2018/0076886 A1* | 3/2018 | Mehrvar | H04L 7/0075 |
| 2019/0253170 A1* | 8/2019 | Farra | H04W 56/0045 |
| 2019/0372665 A1* | 12/2019 | Masuda | G01M 11/39 |

OTHER PUBLICATIONS

IEEE, "IEEE Standards Interpretations for IEEE Std 1588™-2008 IEEE Standard for a Precision Clock Synchronization Protocol for Networked Measurement and Control Systems", IEEE Standards Association, 2011, New York, New York, 29 pages.

* cited by examiner

MEASURING FIBER ASYMMETRY

TECHNICAL FIELD

The present disclosure relates to optical networks.

BACKGROUND

Optical networks are commonly employed to transmit data. Wavelength-division multiplexing (WDM) and dense wavelength-divisional multiplexing (DWDM) techniques may be used to transmit data in optical signals over a common or shared optical fiber, sometimes referred to as an optical link. In these techniques, clocks at the respective network elements, nodes, and/or devices are synchronized. To ensure synchronization of the clocks, the network elements include a Global Positioning System (GPS) receiver and an external GPS antenna to receive exact time information. External disturbances from an environment can introduce errors in clock synchronization via the GPS receivers and the GPS antennas.

Another approach to synchronizing clocks is to distribute Time of Day (TOD) information using a Precision Time Protocol (PTP) defined by Institute of Electrical and Electronics Engineers (IEEE) standard 1588v2. The IEEE 1588v2 standard defines synchronization and distribution of Time Of Day from a master clock of a master node to one or more slave clocks of slave nodes, remote slave clients, or another master node. In the PTP, the clocks are synchronized throughout a packet-switched network. Synchronization is achieved using packets that are transmitted and received in a session between the master clock and the slave clock. Messages are received after "some time" because of a delay in propagation of signals through the physical medium (optical fibers). This propagation delay is an error that is to be calculated and compensated for when synchronizing clocks. The PTP calculates the round trip delay between the master clock and the slave clock. The delay or latency between the master node and slave node(s) is assumed to be half of a round trip latency delay. Accordingly, the PTP calculations assume that the optical fiber of a forward path and the optical fiber of a reverse path are symmetrical. The PTP calculations introduce error when the optical fibers are asymmetrical.

DESCRIPTION OF EXAMPLE EMBODIMENTS

Overview

Briefly, in one embodiment, methods are presented for measurement of asymmetry of path lengths of optical fibers on forward and return paths. In these methods, a second optical network device receives, at a first arrival time, from a first optical network device, a first optical signal transmitted on a first optical fiber and also receives, at a second arrival time, from the first optical network device, a second optical signal transmitted on a second optical fiber. The second optical network device calculates a first time difference between the second arrival time of the second optical signal and the first arrival time of the first optical signal. The second optical network device determines a measure of asymmetry between the first optical fiber and the second optical fiber based on the first time difference and a second time difference between a first time of transmission by the first optical network device of the first optical signal and a second time of transmission by the first optical network device of the second optical signal.

EXAMPLE EMBODIMENTS

Service providers may wish to not rely on a Global Navigation Satellite System (GNSS) for next generation networks, such as a fifth generation (5G) mobile network, because GNSS signals can be easily disturbed and cause an error. The next generation networks use and rely on accurate network synchronization. For example, new systems are improving a resolution of timestamping transport accuracy to comply with class C profiles specified by International Telecommunication Union (ITU) (8273.2 Timing Characteristics of telecom boundary clocks and telecom time slave clocks (October 2018), which limits Constant Time Error to +/−10 nanoseconds per each optical network node.

For next generation networks, service providers may use a timing distribution model based on the IEEE 1588v2 protocol provided adjustment can be made for the asymmetry between the lengths of forward path and reverse path optical fibers. Techniques are presented herein that combine the round trip delay calculation supported by the PTP of IEEE 1588v2 with a calculated asymmetry of the forward path and reverse path optical fibers to reduce errors in synchronization of clocks of optical nodes that are in communication with each other. In one form, an optical switch is deployed in each optical node. The optical switch enables switching of a propagation direction of optical signals between the forward path and the reverse path. Accordingly, the first optical network device sends packets on both optical fibers to the second optical network device and the asymmetry of the forward path and reverse path optical fibers can be calculated based on a difference between the transmission times and arrival times of the packets. Based on the asymmetry of the optical fibers, a time offset value is adjusted when computing a round trip delay using the PTP protocol, and the clocks can be synchronized with high precision. These techniques improve the resolution of the measure of the asymmetry up to the resolution of an optical network device inserting and extracting the timestamping packets that is less than a nanosecond (a precision of less than 40 centimeters of optical fiber).

Even if the fiber asymmetry is not inherently impacting the accuracy of signal processing at a given node, the PTP distribution accuracy is impacted because each meter of asymmetry introduces an error of 2.5 nanoseconds. Since network deployments may have uncontrolled path asymmetries of several meters due to patch panels and fiber patches, the techniques presented herein can measure the asymmetry of the optical fibers and adjust the PTP measurements accordingly.

The use of PTP over a bidirectional Optical Service Channel (OSC) is an alternative to measuring the asymmetry of the optical fibers. Since in the bidirectional OSC, the PTP travels only on one fiber, there is no path asymmetry. However, deploying the bidirectional OSC in an optical network is less desirable and separate optical fibers for each path may be preferred. In one example embodiment, the asymmetry is measured without using an Optical Time Domain Reflectometer (OTDR) integrated inside the nodes, which may also be costly and inaccurate.

In various example embodiments, the timestanping mechanism available for the IEEE 1588v2 PTP transport is used to calculate the fiber asymmetry in conjunction with an optical switch. The resolution of the measure of the asymmetry is based on the resolution of digital device inserting/extracting the timestamps, which is less than a nanosecond (and in terms of fiber length is less than 40 cm).

In yet another example embodiment, when the optical network devices are connected without amplification, the PTP is transported on a single channel (wavelength). This single channel may also be used for data traffic. The optical network devices do not employ the OSC in this situation. The optical switch is then deployed in front of the full line or interface, as detailed below.

Figure 1:
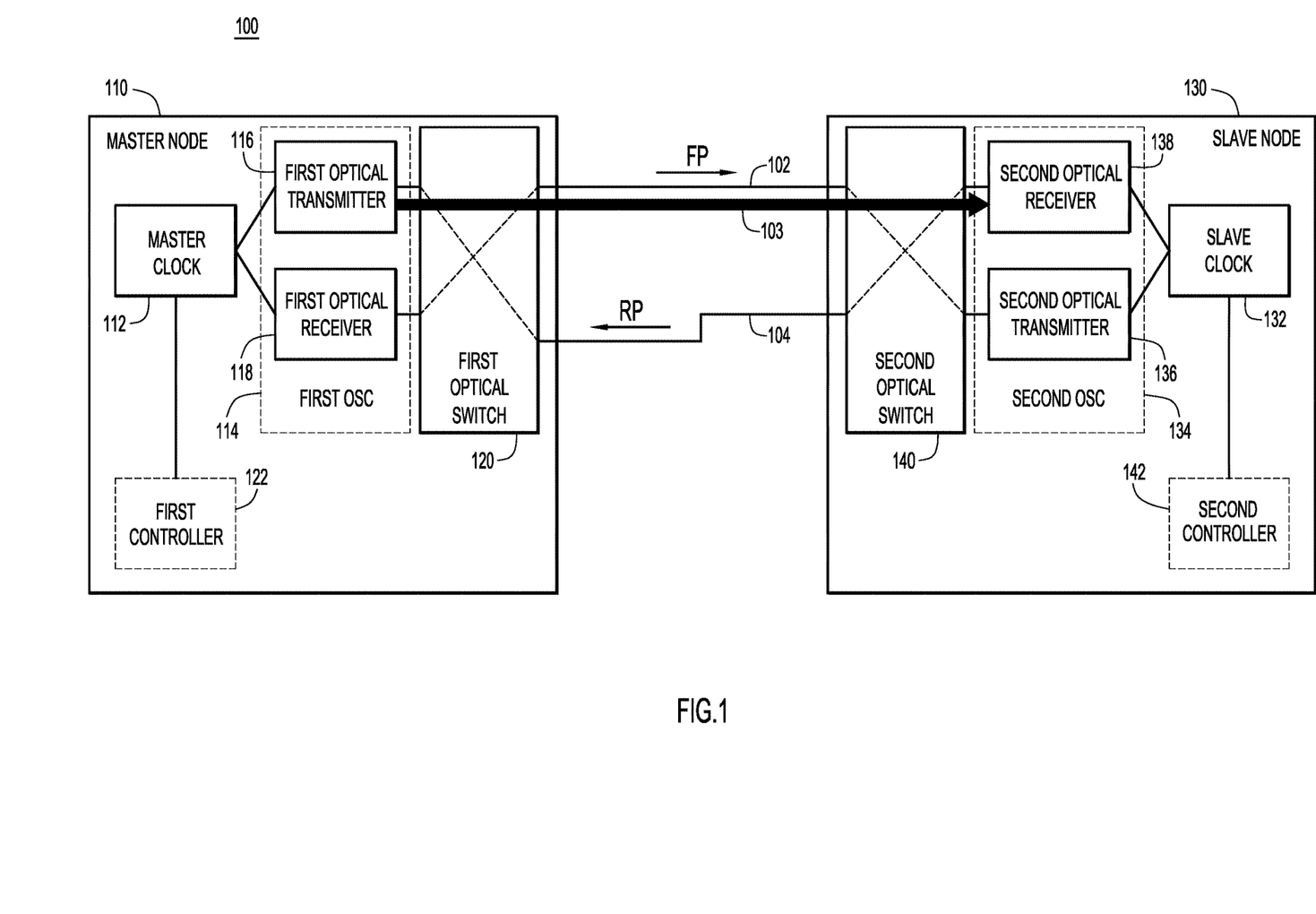
FIG. 1 is a block diagram illustrating an optical network including first and second optical nodes configured to measure propagation delay of an optical signal transmitted through a first optical fiber of a forward path, according to an example embodiment.
Figure 2:
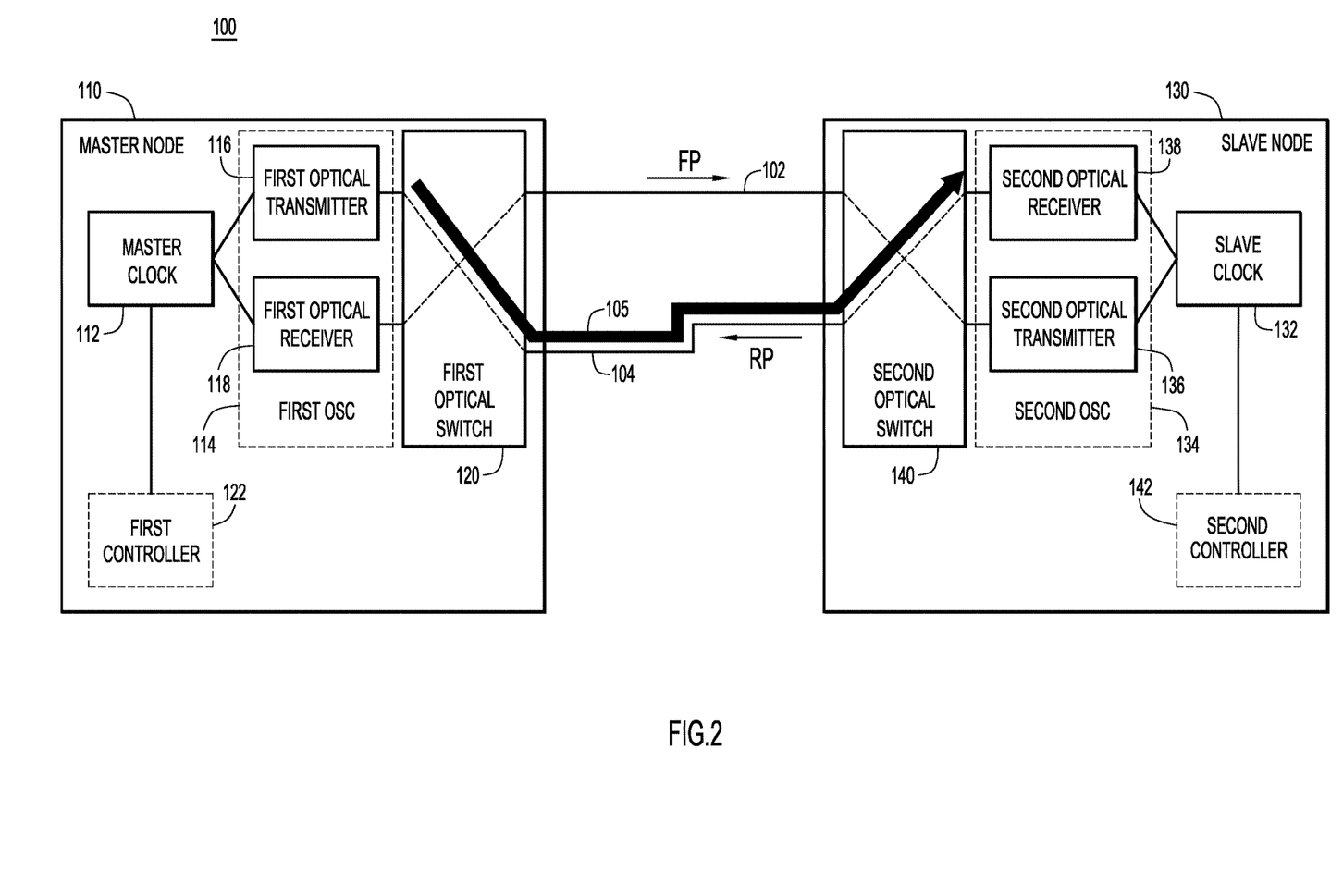
FIG. 2 is a block diagram illustrating the optical network of FIG. 1 in which the first and second optical nodes are configured to measure propagation delay of an optical signal transmitted through a second optical fiber of a reverse path, according to an example embodiment.

Reference is now made to FIG. 1 that illustrates a block diagram depicting an optical network 100 that includes first and second optical nodes (e.g., a master node and a slave node, respectively) configured to measure propagation delay of an optical signal transmitted through a first optical fiber of a forward path between the first and second optical nodes, according to an example embodiment. A similar arrangement of the optical network 100 is shown in FIG. 2 in which the first and second optical nodes are configured to measure propagation delay of an optical signal transmitted through a second optical fiber of a reverse path between the first and second optical nodes.

The optical network 100 may employ WDM or DWDM technologies. In FIG. 1, the optical network 100 includes a forward path (FP) optical fiber 102 and a reverse path (RP) optical fiber 104 connected between a master node 110 and a slave node 130. The optical network 100 may include multiple nodes and the number of nodes depends on a particular configuration of the optical network 100 and is not limited to the example depicted in FIG. 1.

The FP optical fiber 102 and the RP optical fiber 104 provide bidirectional communication between the master node 110 and the slave node 130. The FP optical fiber 102 supports at least one optical communication channel from the master node 110 to the slave node 130. The RP optical fiber 104 supports at least one optical communication channel from the slave node 130 to the master node 110. The FP optical fiber 102 may span the same wavelengths as the RP optical fiber 104 i.e., frequency synchronized or frequency locked. The FP optical fiber 102 may have a different length than that of the RP optical fiber 104, as shown in FIG. 1.

Since the FP optical fiber 102 and the RP optical fiber 104 may have different lengths, the paths associated with the FP optical fiber 102 and the RP optical fiber 104 may be considered asymmetrical.

The master node 110 and the slave node 130 are optical network elements or devices (nodes), such as optical transponders, which are connected to one another via the FP optical fiber 102 and the RP optical fiber 104. The master node 110 includes a master clock 112, a first optical supervisory channel component (OSC) 114, a first optical transmitter 116, a first optical receiver 118, a first optical switch 120, and a first controller 122 that includes a processor and memory. The slave node 130 includes a slave clock 132, a second OSC 134, a second optical transmitter 136, a second optical receiver 138, a second optical switch 140, and a second controller 142 that includes a processor and memory.

The optical transmitters 116 and 136 each includes a transmitter module and a transmitter digital signal processor (DSP), not shown. The optical receivers 118 and 138, each includes a receiver module and a receiver DSP, not shown. The transmitter module and the receiver module may be optical pluggable modules configured to transmit and receive optical signals, respectively. The DSPs process electrical signals by performing various signal processing operations. The first and second optical switches 120 and 140 may be a cross switch. The first optical switch 120 may be arranged between the FP and RP optical fibers 102 and 104 and the first optical transmitter 116 and the first optical receiver 118. Likewise, the second optical switch 140 may be arranged between the FP and RP optical fibers 102 and 104 and the second optical transmitter 136 and second optical receiver 138. This arrangement allows for changing the direction of optical signal propagation on one of the FP optical fiber 102 or the RP optical fiber 104, as explained further below. The first and second controllers 122 and 142 control the components of the respective optical network elements.

In one example embodiment depicted in FIG. 1, the first optical transmitter 116 and the first optical receiver 118 are part of the first OSC 114 and the second optical transmitter 136 and second optical receiver 138 are part of the second OSC 134. That is, the optical network 100 may be a metro network that is optically amplified. In a metro network, wavelengths or optical channels transporting customer traffic are amplified by optical amplifiers (such as Erbium-Doped Fiber Amplifiers) placed along the way. Since asymmetries introduced by the presence of various optical amplifiers may be difficult to track, the PTP packets are transported out of band via an optical service channel (OSC). The OSC is a control channel that does not cross any of the optical amplifiers and is regenerated at every optical network element.

In yet another example embodiment, the first optical transmitter 116 and the first optical receiver 118 may be part of a line card or an interface for customer traffic. Likewise, the second optical transmitter 136 and the second optical receiver 138 may be part of a line card or interface for customer traffic. In this case, the optical network 100 may be a backhaul network that connects two remote sites in a mobile access application without any amplification along the way. Since no amplifiers are deployed, only one single channel or wavelength may be sufficient to transport both customer/data traffic and control data. The optical network 100 deployed without the first OSC 114 and the second OSC 134 uses the channel for customer/data traffic to transport the packets used for purposes of the techniques presented herein The optical network 100 may be deployed to support coherent optics applications.

In FIG. 1, the master node 110 generates a first optical signal 103. The first optical signal 103 is transmitted on the FP optical fiber 102 from the master node 110 to the slave node 130. The first optical switch 120 connects the first optical transmitter 116 to the FP optical fiber 102 and the second optical switch 140 connects the second optical receiver 138 to the FP optical fiber 102, thereby propagating the first optical signal 103 on the FP optical fiber 102 from the master node 110 to the slave node 130.

Reference is now made to FIG. 2 that illustrates the optical network 100 in which the first and second optical nodes are configured to measure propagation delay of an optical signal transmitted through the RP optical fiber 104, according to an example embodiment. FIG. 2 depicts the same network components as FIG. 1, detailed explanations of which are omitted for the sake of brevity.

In FIG. 2, the optical switches 120 and 140 are toggled. As a result, the first optical transmitter 116 is connected to the RP optical fiber 104 via a cross connect function of the first optical switch 120 and the second optical receiver 138 is connected to the RP optical fiber 104 via a cross connect function of the second optical switch 140. A second optical signal 105 is propagated via the RP optical fiber 104 from the master node 110 to the slave node 130.

In an example embodiment, the master clock 112 and the slave clock 132 are synchronized to have the same TOD, using the technique presented herein explained in more detail below with reference to FIG. 3.

Figure 3:
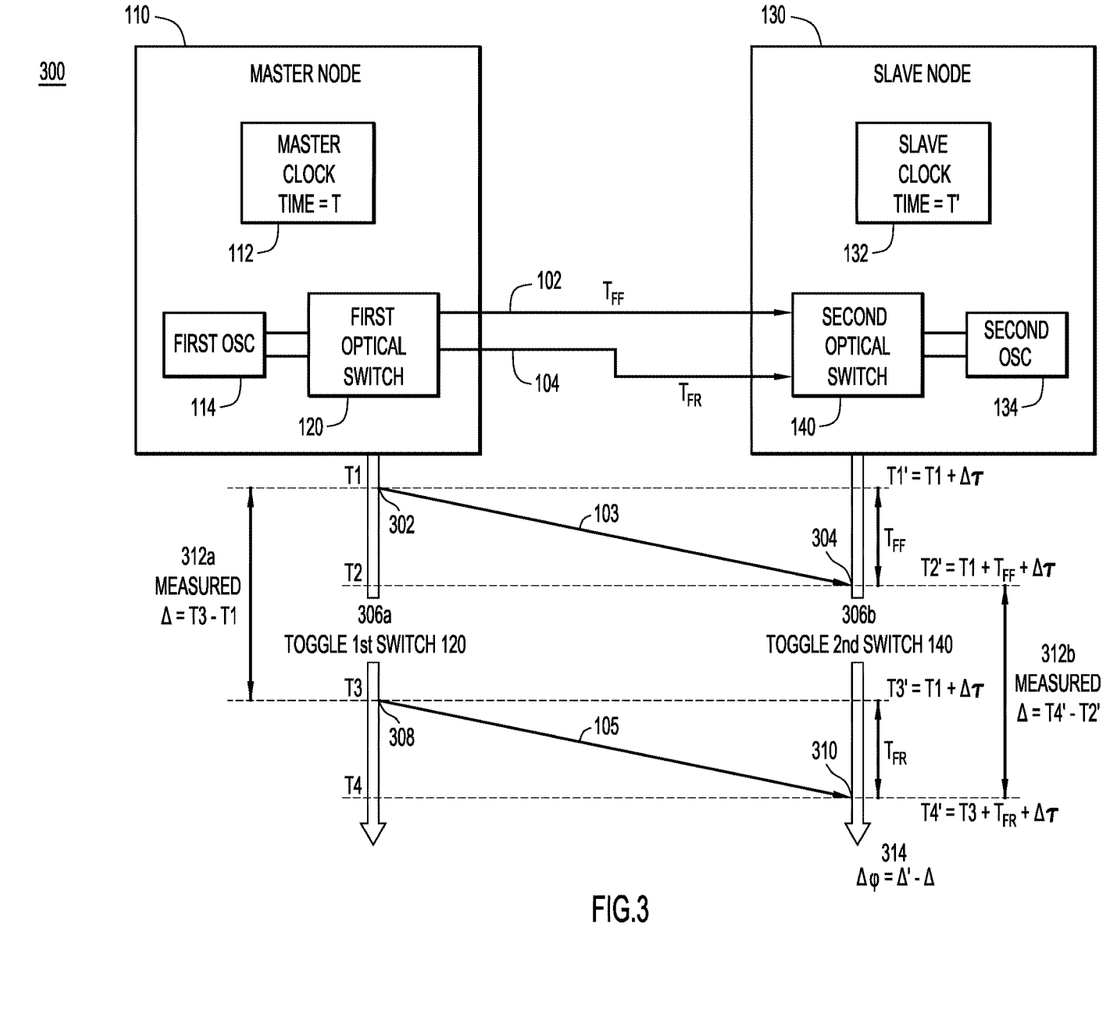
FIG. 3 is a diagram illustrating a method of obtaining propagation delays of optical signals transmitted through a first optical fiber of a forward path and through a second optical fiber of a reverse path, according to an example embodiment.

FIG. 3 is a diagram illustrating a method 300 of obtaining propagation delays of optical signals transmitted through a first optical fiber of a forward path and through a second optical fiber of a reverse path, according to an example embodiment. Reference is also made to FIGS. 1 and 2 for purposes of the description of FIG. 3. FIG. 3 depicts at least some of the same network components as FIG. 1, detailed explanations of which are omitted for the sake of brevity. While FIG. 3 depicts the first OSC 114 and the second OSC 134, according to another example embodiment, the first OSC 114 and the second OSC 134 may be omitted.

FIG. 3 depicts the master node 110 and the slave node 130 being connected by the FP optical fiber 102 and the RP optical fiber 104. The master node 110 transmits a first packet in the first optical signal 103 (FIG. 1) to the slave node 130 via the FP optical fiber 102 and transmits a second packet in the second optical signal 105 (FIG. 2) via the RP optical fiber 104.

The master node 110 and the slave node 130 are frequency locked by Synchronous Ethernet (SyncE) signaling, for example. Synchronous Ethernet is an ITU-T standard for computer networking that facilitates the transference of clock signals over the Ethernet physical layer. This signal can be made traceable to an external clock. The master clock 112 of the master node 110 is set to a time T. The slave clock 132 of the slave node 130 is set to the time T'. The offset between the Time of Day (TOD) of the master clock 112 and the slave clock 132 is unknown such that $T'=T+\Delta\tau$, where $\Delta\tau$ is the unknown offset between the two clocks 112 and 132. In an example embodiment, the path asymmetry is calculated based on a difference in flying time between the FP optical fiber 102 and the RP optical fiber 104, as detailed below. The path asymmetry is independent from the time error of the two nodes, i.e., the unknown offset ($\Delta\tau$).

At 302, the master node 110 sends the first packet in the first optical signal 103, at time T1, via the FP optical fiber 102, to the slave node 130. When the first packet is received by the slave node 130, the slave node 130 clocks (timestamps) a first arrival time T2' of the first packet, at 304. The first arrival time $T2'=T1+T_{FF}+\Delta\tau$, where $T_{FF}$ is a propagation delay of the first optical signal 103 on the FP optical fiber 102 i.e., fly time in a forward direction. The slave node 130 stores the first arrival time T2', clocked by the slave clock 132, in the second controller 142.

Next, at 306a, the first optical switch 120 is toggled in the master node 110 and at 306b, the second optical switch 140 is toggled in the slave node 130. In this way, the master node 110 and slave node 130 are configured to reverse the propagation direction of optical signals such that the master node 110 transmits a second packet via the RP optical fiber 104 instead of the master node 110 receiving optical signals from slave node 130 on the RP optical fiber 104.

In particular, at 308, the master node 110 sends the second packet in the second optical signal 105, at time T3, via the RP optical fiber 104, to the slave node 130. When the second packet is received by the slave node 130, the slave node 130 clocks a second arrival time T4' of the second packet, at 310. The second arrival time $T4'=T3+T_{FR}+\Delta\tau$, where $T_{FR}$ is a propagation delay of the second optical signal 105 on the RP optical fiber 104 i.e., fly time in a reverse direction. The slave node 130 stores the second arrival time T4', clocked by the slave clock 132, in the second controller 142.

At 312a, the master node 110 calculates a first time difference ($\Delta$). The first time difference is a difference between the second transmission time T3 of the second packet time and the first transmission time T1 of the first packet ($\Delta=T3-T1$).

At 312b, the slave node 130 calculates a second time difference ($\Delta'$). The second time difference is a difference between the second arrival time T4' and the first arrival time T2' ($\Delta'=T4'-T2'$).

At 314, the slave node 130 determines the path asymmetry ($\Delta\varphi$) or a skew between the FP optical fiber 102 and the RP optical fiber 104 based on the first time difference ($\Delta$) and the second time difference ($\Delta'$). The path asymmetry ($\Delta\varphi$) is a difference between the first time difference and the second time difference ($\Delta'-\Delta$). The path asymmetry ($\Delta\varphi$) is the difference between the flight time in the forward direction ($T_{FF}$) and the flight time in the reverse direction ($T_{FR}$) and is independent of unknown offset ($\Delta\tau$). That is:

$$\Delta\varphi = \Delta' - \Delta = (T4' - T2') - (T3 - T1)$$
$$= ((T3 + T_{FR} + \Delta\tau) - (T1 + T_{FF} + \Delta\tau)) - (T3 - T1)$$
$$= T3 + T_{FR} + \Delta\tau - T1 - T_{FF} - \Delta\tau - T3 + T1$$
$$= T_{FR} - T_{FF}$$

As noted above, one meter of an optical fiber introduces a latency of 5 nanoseconds. This may result in a skew between the optical fibers, thereby introducing an offset of TOD difference. For example, one meter of asymmetry in the optical fibers, introduces an error of 2.5 nanoseconds that is comparable with a profile of Class C that uses Constant Time Error limit +/−10 nanoseconds. In an example embodiment, the asymmetry is considered when synchronizing the clocks of the first and second nodes that are in communication with each other, thus avoiding additional time errors.

The master clock 112 and the slave clock 132 may be synchronized using the PTP packet exchange but factoring into or adjusting the offset value based on the calculated path asymmetry (Δφ). According to one example embodiment, based on the estimated path asymmetry (Δφ), an accurate propagation delay may be factored into clock synchronization. The TOD of the slave clock 132 is set to the time of the master clock 112 adjusted by an offset. Accordingly, the TOD of the master clock 112 (T), received by the slave node 130, is to be adjusted by an offset that factors in the asymmetry of the optical fibers (T'=T+offset), where the offset value or the propagation delay accounts for or includes the estimated path asymmetry (Δφ). In short, the path asymmetry (Δφ) between the FP optical fiber 102 and the RP optical fiber 104 is obtained and this value is plugged into the PTP protocol by proportionally adjusting the offset in setting the TOD of the slave clock 132.

While FIG. 3 describes the master node 110 determining the first time difference (Δ) at 312a and the slave node 130 determining the second time difference (Δ') at 312b, this is only an example. According to yet another example embodiment, the second time difference (Δ') may be provided by the slave node 130 to the master node 110 and the master node 110 may then calculate the path asymmetry Δφ. According to yet another example embodiment, the first optical signal may include a first message that contains the first time of transmission (T1) and the second optical signal may include a second message that contains the second time of transmission (T2). Accordingly, the slave node 130 may compute the first time difference (Δ) as well as the second time difference (Δ') between the transmission times of the two packets.

Example embodiments are directed to measuring asymmetry of the optical fibers using an optical switch inserted into an optical node to reverse the direction of signal propagation on one of the two fibers connecting between first and second optical nodes. The packets are transmitted at specific times and arrival times of the packets are measured (using PTP packets transported via an OSC or a traffic channel, depending on a particular network deployment). Based on transmission times and arrival times of the packets, propagation delays are determined. Based on the difference between the propagation delays of these two fibers, fiber asymmetry is determined.

Figure 4:
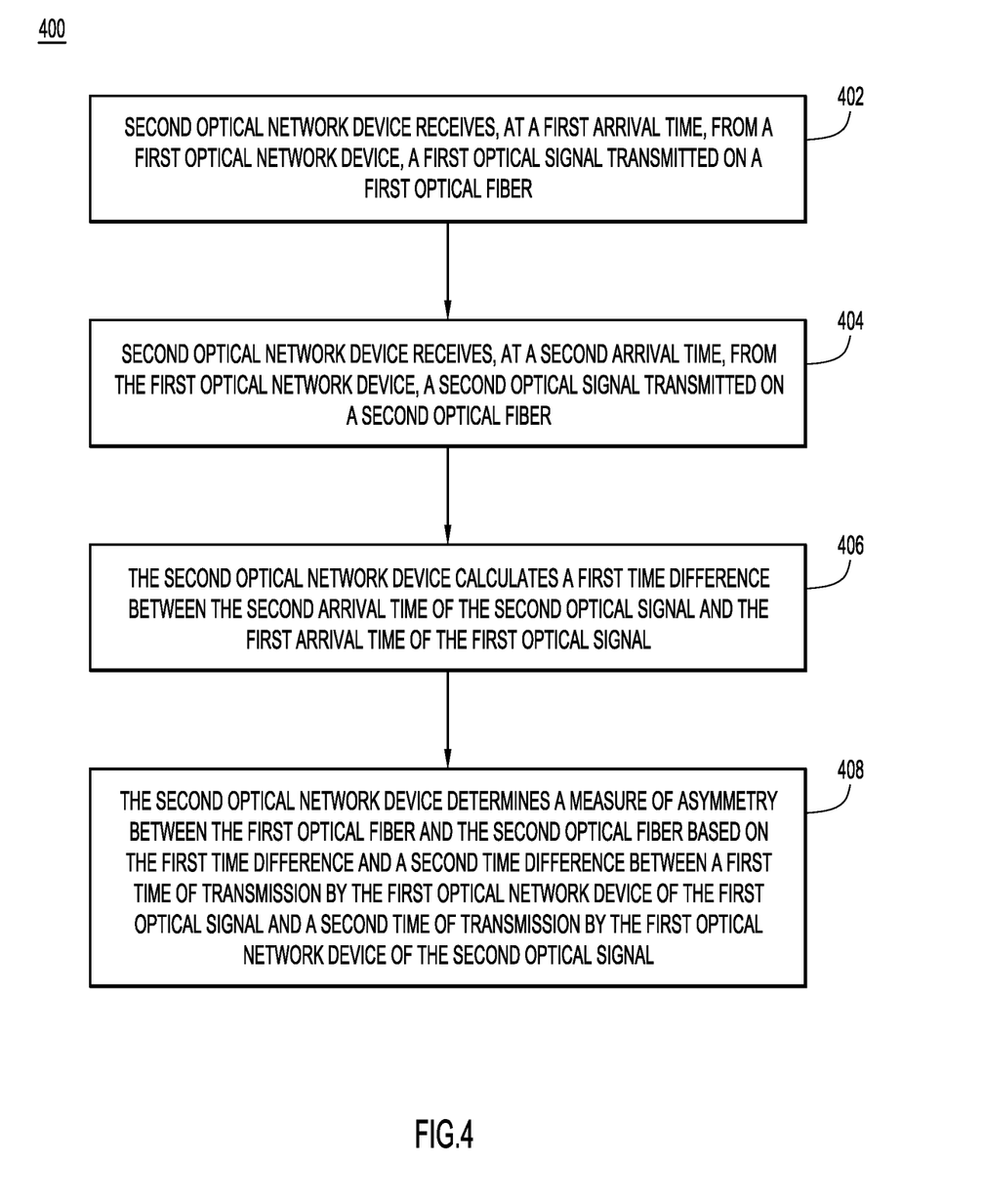
FIG. 4 is a flowchart generally depicting a method of determining path asymmetry between a first optical fiber of a forward path and a second optical fiber of a reverse path in an optical network, according to an example embodiment.

Turning now to FIG. 4, a flowchart is now described for a method 400 of determining path asymmetry between a first optical fiber of a forward path and a second optical fiber of a reverse path in an optical network, according to an example embodiment. The method 400 is performed by an optical network device e.g., the master node 110 or the slave node 130, shown in FIGS. 1-3.

At 402, the second optical network device receives, at a first arrival time, from a first optical network device, a first optical signal transmitted on a first optical fiber.

At 404, the second optical network device receives, at a second arrival time, from the first optical network device, a second optical signal transmitted on a second optical fiber.

At 406, the second optical network device calculates a first time difference between the second arrival time of the second optical signal and the first arrival time of the first optical signal.

At 408, the second optical network device determines a measure of asymmetry between the first optical fiber and the second optical fiber based on the first time difference and a second time difference between a first time of transmission by the first optical network device of the first optical signal and a second time of transmission by the first optical network device of the second optical signal.

The method 400 may further include receiving, by the second optical network device from the first optical network device, the second time difference computed by the first optical network device.

In the method 400, the operation 408 of determining the measure of asymmetry between the first optical fiber and the second optical fiber may include calculating, by the second optical network device, a path difference based on a difference between the first time difference and the second time difference, wherein the path difference represents the measure of asymmetry.

In the method 400, the operation 404 of receiving the second optical signal may include switching, by the second optical network device, from transmitting to the first optical network device, on the second optical fiber, to receiving, via the second optical fiber, the second optical signal from the first optical network device.

In one form, the method 400 may further include frequency synchronizing a first clock of the first optical network device with a second clock of the second optical network device prior to the first optical network device transmitting the first optical signal and the second optical signal.

The method 400 may further include converting, by the second optical network device, the measure of asymmetry into a time offset value and adjusting, by the second optical network device, a time reference of the second optical network device based on the time offset value.

In one form, the operation of adjusting the time reference may include adjusting an offset value based on the measure of asymmetry when computing a round trip delay based on a timing protocol between the first optical fiber and the second optical fiber. The method 400 may further include synchronizing a second clock of the second optical network device with a first clock of the first optical network device using the timing protocol and the offset value.

According to one or more example embodiments, the operation 402 of receiving the first optical signal may include receiving, by the second optical network device, the first optical signal, transmitted via an optical service channel on the first optical fiber and the operation 404 of receiving the second optical signal may include receiving, by the second optical network device, the second optical signal, transmitted via the optical service channel on the second optical fiber.

According to yet other example embodiments, the operation 402 of receiving the first optical signal may include receiving, by the second optical network device, the first optical signal, transmitted at a first wavelength that transmits traffic data and the operation 404 of receiving the second optical signal may include receiving, by the second optical network device, the second optical signal, transmitted at the first wavelength that transmits the traffic data from the second optical network device to the first optical network device.

In the method 400, the operation 402 of receiving the first optical signal may include receiving, by the second optical network device, the first optical signal, transmitted over a data channel that transmits data traffic from the first optical network device to the second optical network device. Likewise, the operation 404 of receiving the second optical signal may include receiving, by the second optical network device, the second optical signal, transmitted over the data channel that transmits the data traffic from the second optical network device to the first optical network device.

As described above, the first optical signal may include a first message that contains the first time of transmission and the second optical signal may include a second message that contains the second time of transmission.

Figure 5:
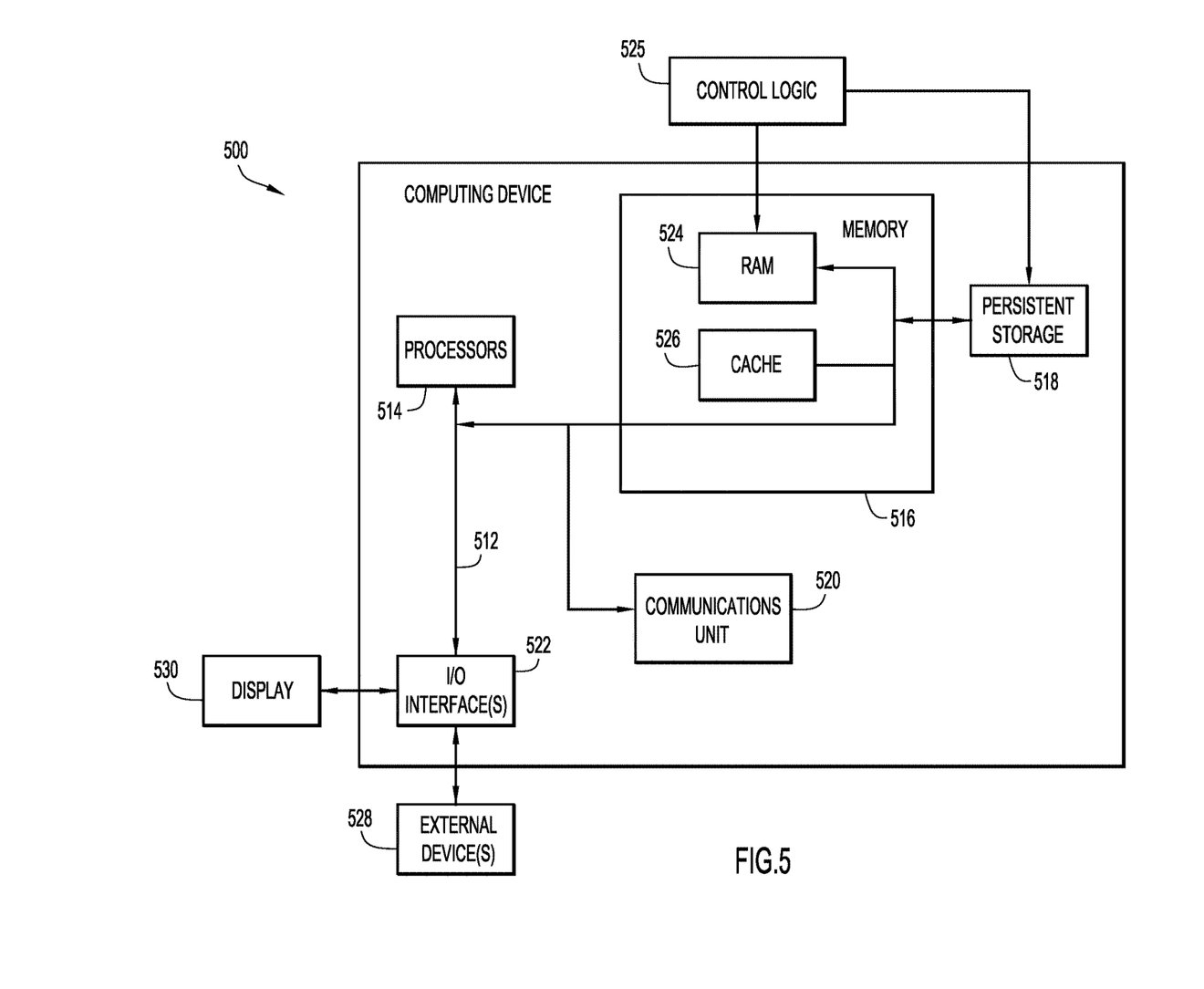
FIG. 5 is a hardware block diagram of a device configured to perform the techniques for determining asymmetry of optical fibers to synchronize clocks of optical nodes in an optical network, according to various example embodiments.

FIG. 5 is a hardware block diagram illustrating a computing device 500 that may perform the functions of an optical network device referred to herein in connection with FIGS. 1-4, according to example embodiments. The computing device 500 performs the functions of the master node 110 or of the slave node 130, as described above in connection with FIGS. 1-4.

It should be appreciated that FIG. 5 provides only an illustration of one embodiment and does not imply any limitations with regard to the environments in which different embodiments may be implemented. Many modifications to the depicted environment may be made.

As depicted, the computing device 500 includes a bus 512, which provides communications between computer processor(s) 514, memory 516, persistent storage 518, communications unit 520, and input/output (I/O) interface(s) 522. Bus 512 can be implemented with any architecture designed for passing data and/or control information between processors (such as microprocessors, communications and network processors, etc.), system memory, peripheral devices, and any other hardware components within a system. For example, bus 512 can be implemented with one or more buses.

Memory 516 and persistent storage 518 are computer readable storage media. In the depicted embodiment, memory 516 includes random access memory (RAM) 524 and cache memory 526. In general, memory 516 can include any suitable volatile or non-volatile computer readable storage media. Instructions for the control logic 525 may be stored in memory 516 or persistent storage 518 for execution by processor(s) 514.

The control logic 525 includes instructions that, when executed by the computer processor(s) 514, cause the computing device 500 to perform one or more of the methods described herein including a method of determining a measure of asymmetry between the first optical fiber and the second optical fiber based on the first time difference obtained from arrival times of the first and second optical signals propagated through two different fibers and a second time difference obtained from transmission times of the first and second optical signals. The control logic 525 may be stored in the memory 516 or the persistent storage 518 for execution by the computer processor(s) 514.

One or more programs may be stored in persistent storage 518 for execution by one or more of the respective computer processors 514 via one or more memories of memory 516. The persistent storage 518 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 518 may also be removable. For example, a removable hard drive may be used for persistent storage 518. Other examples include optical and magnetic disks, thumb drives, and smart cards that are inserted into a drive for transfer onto another computer readable storage medium that is also part of persistent storage 518.

Communications unit 520, in these examples, provides for communications with other data processing systems or devices. In these examples, communications unit 520 includes one or more network interface cards. Communications unit 520 may provide communications through the use of either or both physical and wireless communications links.

I/O interface(s) 522 allows for input and output of data with other devices that may be connected to computing device 500. For example, I/O interface 522 may provide a connection to external devices 528 such as a keyboard, keypad, a touch screen, and/or some other suitable input device. External devices 528 can also include portable computer readable storage media such as database systems, thumb drives, portable optical or magnetic disks, and memory cards.

Software and data used to practice embodiments can be stored on such portable computer readable storage media and can be loaded onto persistent storage 518 via I/O interface(s) 522. I/O interface(s) 522 may also connect to a display 530. Display 530 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, standalone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, virtual private network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

In still another example embodiment, an apparatus is an optical network device. The apparatus includes a communication interface, a memory configured to store executable instructions, and a processor coupled to the communication interface and the memory. The processor is configured to perform operations that include receiving, via the communication interface, at a first arrival time, from a first optical network device, a first optical signal transmitted on a first optical fiber and receiving, via the communication interface, at a second arrival time, from the first optical network device, a second optical signal transmitted on a second optical fiber. The processor is further configured to perform the operations of calculating a first time difference between the second arrival time of the second optical signal and the first arrival time of the first optical signal and determining a measure of asymmetry between the first optical fiber and the second optical fiber based on the first time difference and a second time difference between a first time of transmission by the first optical network device of the first optical signal and a second time of transmission by the first optical network device of the second optical signal.

The processor may further be configured to perform the operations including receiving, via the communication interface from the first optical network device, the second time difference computed by the first optical network device.

In one form, the processor may further be configured to perform the operation of determining the measure of asymmetry between the first optical fiber and the second optical fiber by calculating a path difference based on a difference between the first time difference and the second time difference. The path difference may represent the measure of asymmetry.

In one or more example embodiments, the apparatus may further include a switch that switches from transmitting to the first optical network device, on the second optical fiber, to receiving, via the second optical fiber, the second optical signal from the first optical network device.

According to one or more example embodiments, the processor may further be configured to perform the operations including frequency synchronizing a first clock of the first optical network device with a second clock of the apparatus prior to the first optical network device transmitting the first optical signal and the second optical signal.

The processor may further be configured to perform the operations including converting the measure of asymmetry into a time offset value and adjusting a time reference of the apparatus based on the time offset value.

In another form, the processor may be configured to perform the operation of adjusting the time reference by adjusting an offset value based on the measure of asymmetry when computing a round trip delay based on a timing protocol between the first optical fiber and the second optical fiber.

The processor may further be configured to perform the operations including synchronizing a second clock of the apparatus with a first clock of the first optical network device using the timing protocol and the offset value.

The processor may be configured to perform the operation of receiving the first optical signal by receiving, via the communication interface, the first optical signal, transmitted via an optical service channel on the first optical fiber. Additionally, the processor may be configured to perform the operation of receiving the second optical signal by receiving, via the communication interface, the second optical signal, transmitted via the optical service channel on the second optical fiber.

In another form, the processor may be configured to perform the operation of receiving the first optical signal by receiving, via the communication interface, the first optical signal, transmitted at a first wavelength that transmits traffic data and to perform the operation of receiving the second optical signal by receiving, via the communication interface, the second optical signal, transmitted at the first wavelength that transmits the traffic data from the apparatus to the first optical network device.

The processor may be configured to perform the operation of receiving the first optical signal by receiving, via the communication interface, the first optical signal, transmitted over a data channel that transmits data traffic from the first optical network device to the apparatus. Additionally, the processor may be configured to perform the operation of receiving the second optical signal by receiving, via the communication interface, the second optical signal, transmitted over the data channel that transmits the data traffic from the apparatus to the first optical network device.

According to one or more example embodiments, the first optical signal includes a first message that contains the first time of transmission and the second optical signal includes a second message that contains the second time of transmission.

In yet another example embodiment, one or more non-transitory computer readable storage media encoded with instructions are provided. When the media is executed by the processor, the instructions cause the processor to perform operations including receiving, at a first arrival time, from a first optical network device, a first optical signal transmitted on a first optical fiber and receiving, at a second arrival time, from the first optical network device, a second optical signal transmitted on a second optical fiber. The operations further include calculating a first time difference between the second arrival time of the second optical signal and the first arrival time of the first optical signal and determining a measure of asymmetry between the first optical fiber and the second optical fiber based on the first time difference and a second time difference between a first time of transmission by the first optical network device of the first optical signal and a second time of transmission by the first optical network device of the second optical signal.

The instructions may further cause the processor to perform additional operations including receiving, from the first optical network device, the second time difference computed by the first optical network device.

In one form, the instructions may cause the processor to perform the operation of determining the measure of asymmetry between the first optical fiber and the second optical fiber by calculating a path difference based on a difference between the first time difference and the second time difference. The path difference represents the measure of asymmetry.

The instructions may cause the processor to perform the operation of receiving the second optical signal by switching from transmitting to the first optical network device, on the second optical fiber, to receiving, via the second optical fiber, the second optical signal from the first optical network device.

The instructions may further cause the processor to perform additional operations including frequency synchronizing a first clock of the first optical network device with a second clock of a second optical network device prior to the first optical network device transmitting the first optical signal and the second optical signal.

The instructions may further cause the processor to perform additional operations including converting the measure of asymmetry into a time offset value and adjusting a time reference of a second optical network device based on the time offset value.

The instructions may further cause the processor to perform the operation of adjusting the time reference by adjusting an offset value based on the measure of asymmetry when computing a round trip delay based on a timing protocol between the first optical fiber and the second optical fiber.

The instructions may further cause the processor to perform additional operations including synchronizing a second clock of a second optical network device with a first clock of the first optical network device using the timing protocol and the offset value.

The instructions may further cause the processor to perform the operation of receiving the first optical signal by receiving the first optical signal, transmitted via an optical service channel on the first optical fiber and the operation of receiving the second optical signal by receiving the second optical signal, transmitted via the optical service channel on the second optical fiber.

The instructions may further cause the processor to perform the operation of receiving the first optical signal by receiving the first optical signal, transmitted at a first wavelength that transmits traffic data and the operation of receiving the second optical signal by receiving the second optical signal, transmitted at the first wavelength that transmits the traffic data from the second optical network device to the first optical network device.

The instructions may further cause the processor to perform the operation of receiving the first optical signal by receiving the first optical signal, transmitted over a data channel that transmits data traffic from the first optical network device and to perform the operation of receiving the second optical signal by receiving the second optical signal, transmitted over the data channel that transmits the data traffic to the first optical network device.

According to one or more example embodiments, the first optical signal may include a first message that contains the first time of transmission and the second optical signal may include a second message that contains the second time of transmission.

The embodiments presented may be in other various other forms, such as a system or a computer program product. The computer program product may include a computer readable storage medium (or media) having computer readable program instructions thereon for causing a processor to carry out aspects presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
receiving, at a first arrival time, from a first optical network device by a second optical network device, a first optical signal transmitted on a first optical fiber;
receiving, at a second arrival time, from the first optical network device by the second optical network device, a second optical signal transmitted on a second optical fiber, wherein the second optical fiber is a reverse path optical fiber configured to transmit optical signals from the second optical network device to the first optical network device;
calculating, by the second optical network device, a first time difference between the second arrival time of the second optical signal and the first arrival time of the first optical signal; and
determining, by the second optical network device, a measure of asymmetry between the first optical fiber and the second optical fiber based on the first time difference and a second time difference between a first time of transmission by the first optical network device of the first optical signal and a second time of transmission by the first optical network device of the second optical signal.

2. The method of claim 1, further comprising:
receiving, by the second optical network device from the first optical network device, the second time difference computed by the first optical network device.

3. The method of claim 2, wherein determining the measure of asymmetry between the first optical fiber and the second optical fiber includes:

calculating, by the second optical network device, a path difference based on a difference between the first time difference and the second time difference, wherein the path difference represents the measure of asymmetry.

4. The method of claim 1, wherein receiving the second optical signal includes:
switching, by the second optical network device, from transmitting to the first optical network device, on the second optical fiber, to receiving, via the second optical fiber, the second optical signal from the first optical network device.

5. The method of claim 1, further comprising:
frequency synchronizing a first clock of the first optical network device with a second clock of the second optical network device prior to the first optical network device transmitting the first optical signal and the second optical signal.

6. The method of claim 1, further comprising:
converting, by the second optical network device, the measure of asymmetry into a time offset value; and
adjusting, by the second optical network device, a time reference of the second optical network device based on the time offset value.

7. The method of claim 6, wherein adjusting the time reference includes:
adjusting an offset value based on the measure of asymmetry when computing a round trip delay based on a timing protocol between the first optical fiber and the second optical fiber.

8. The method of claim 7, further comprising:
synchronizing a second clock of the second optical network device with a first clock of the first optical network device using the timing protocol and the offset value.

9. The method of claim 1, wherein:
receiving the first optical signal includes receiving, by the second optical network device, the first optical signal, transmitted via an optical service channel on the first optical fiber; and
receiving the second optical signal includes receiving, by the second optical network device, the second optical signal, transmitted via the optical service channel on the second optical fiber.

10. The method of claim 1, wherein:
receiving the first optical signal includes receiving, by the second optical network device, the first optical signal, transmitted at a first wavelength that transmits traffic data; and
receiving the second optical signal includes receiving, by the second optical network device, the second optical signal, transmitted at the first wavelength that transmits the traffic data from the second optical network device to the first optical network device.

11. The method of claim 1, wherein:
receiving the first optical signal includes receiving, by the second optical network device, the first optical signal, transmitted over a data channel that transmits data traffic from the first optical network device to the second optical network device; and
receiving the second optical signal includes receiving, by the second optical network device, the second optical signal, transmitted over the data channel that transmits the data traffic from the second optical network device to the first optical network device.

12. The method of claim 1, wherein the first optical signal includes a first message that contains the first time of transmission and the second optical signal includes a second message that contains the second time of transmission.

13. An apparatus comprising:
a communication interface;
a memory configured to store executable instructions; and
a processor coupled to the communication interface and the memory and configured to perform operations including:
receiving, via the communication interface, at a first arrival time, from a first optical network device, a first optical signal transmitted on a first optical fiber;
receiving, via the communication interface, at a second arrival time, from the first optical network device, a second optical signal transmitted on a second optical fiber, wherein the second optical fiber is a reverse path optical fiber configured to transmit optical signals to the first optical network device;
calculating a first time difference between the second arrival time of the second optical signal and the first arrival time of the first optical signal; and
determining a measure of asymmetry between the first optical fiber and the second optical fiber based on the first time difference and a second time difference between a first time of transmission by the first optical network device of the first optical signal and a second time of transmission by the first optical network device of the second optical signal.

14. The apparatus of claim 13, wherein the processor is further configured to perform the operations including:
receiving, via the communication interface from the first optical network device, the second time difference computed by the first optical network device.

15. The apparatus of claim 14, wherein the processor is configured to perform the operation of determining the measure of asymmetry between the first optical fiber and the second optical fiber by:
calculating a path difference based on a difference between the first time difference and the second time difference, wherein the path difference represents the measure of asymmetry.

16. The apparatus of claim 13, further comprising:
a switch that switches from transmitting to the first optical network device, on the second optical fiber, to receiving, via the second optical fiber, the second optical signal from the first optical network device.

17. The apparatus of claim 13, wherein the processor is further configured to perform the operations including:
frequency synchronizing a first clock of the first optical network device with a second clock of the apparatus prior to the first optical network device transmitting the first optical signal and the second optical signal.

18. One or more non-transitory computer readable storage media encoded with instructions that, when executed by a processor, cause the processor to perform operations including:
receiving, at a first arrival time, from a first optical network device, a first optical signal transmitted on a first optical fiber;
receiving, at a second arrival time, from the first optical network device, a second optical signal transmitted on a second optical fiber, wherein the second optical fiber is a reverse path optical fiber configured to transmit optical signals to the first optical network device;
calculating a first time difference between the second arrival time of the second optical signal and the first arrival time of the first optical signal; and determining a measure of asymmetry between the first optical fiber and the second optical fiber based on the first time difference and a second time difference between a first time of transmission by the first optical network device of the first optical signal and a second time of transmission by the first optical network device of the second optical signal.

19. The one or more non-transitory computer readable storage media according to claim 18, wherein the instructions further cause the processor to perform additional operations including:

receiving, from the first optical network device, the second time difference computed by the first optical network device.

20. The method of claim 1, further comprising:

switching, by a switch of the second optical network device, from transmitting to the first optical network device, on the second optical fiber, to receiving, via the second optical fiber, the second optical signal from the first optical network device.

* * * * *